(12) United States Patent
Crepin

(10) Patent No.: US 9,085,339 B2
(45) Date of Patent: Jul. 21, 2015

(54) FORWARD AND REVERSE PEDALLING SYSTEM FOR A BICYCLE

(71) Applicant: Jean-Pierre Georges Armand Crepin, Villemomble (FR)

(72) Inventor: Jean-Pierre Georges Armand Crepin, Villemomble (FR)

( * ) Notice: Subject to any disclaimer, the term of this patent is extended or adjusted under 35 U.S.C. 154(b) by 0 days.

(21) Appl. No.: 14/122,065

(22) PCT Filed: Sep. 24, 2012

(86) PCT No.: PCT/FR2012/000377
§ 371 (c)(1),
(2) Date: Nov. 25, 2013

(87) PCT Pub. No.: WO2013/057388
PCT Pub. Date: Apr. 25, 2013

(65) Prior Publication Data
US 2014/0366661 A1 Dec. 18, 2014

(30) Foreign Application Priority Data
Oct. 12, 2011 (FR) ...................................... 11 03106

(51) Int. Cl.
*B62M 9/04* (2006.01)
*B62M 15/00* (2006.01)

(52) U.S. Cl.
CPC ................. *B62M 9/04* (2013.01); *B62M 15/00* (2013.01); *Y10T 74/18568* (2015.01)

(58) Field of Classification Search
CPC ................................ B62M 15/00; B62M 9/04
See application file for complete search history.

(56) References Cited

U.S. PATENT DOCUMENTS

| 4,290,621 | A | * | 9/1981 | Davey | ............................ | 280/216 |
| 5,121,936 | A | * | 6/1992 | Cowan | ............................ | 280/236 |
| 2006/0119068 | A1 | * | 6/2006 | Hee | ................................ | 280/260 |

FOREIGN PATENT DOCUMENTS

| CN | 2243434 | 12/1996 |
| FI | 838 | 5/1898 |
| JP | 2008304032 | 12/2008 |

OTHER PUBLICATIONS

International Search Report—PCT/FR2012/000377.

\* cited by examiner

*Primary Examiner* — Kevin Hurley
(74) *Attorney, Agent, or Firm* — Gottlieb, Rackman & Reisman, P.C.

(57) ABSTRACT

A forward and reverse pedaling system for a bicycle with automatic gear change replacing the derailleur and clutch operating at a very low speed using an engagement wheel (16), all enclosed within a housing case filled with oil. The two wheels (11) and (13), which are themselves driven by rods (9) and (10), make a reciprocating to and fro motion of less than a half turn regardless of the direction of rotation of the drive wheel (1) and drive the wheel (12) followed by the driven wheel (2) via the low speed clutch between the wheels (15) and (16). This system can be applied to any mechanical assembly in which it is required, and is not limited to use in bicycles.

9 Claims, 8 Drawing Sheets

FORWARD AND REVERSE PEDALLING SYSTEM FOR A BICYCLE

A system for forward and reverse pedaling for a bicycle with automatic gear change replacing the derailleur and clutch functioning at very low speed using an engagement wheel (16), the whole enclosed, in a housing case filled with oil. The two wheels (11) and (13) themselves driven by the rods (9) and (10) make a reciprocating to and fro movement of less than half a turn regardless of the direction of rotation of the drive wheel (1). The pawls (17) and (18) on the wheels (11) and (13), each provided with a small spring for being applied to the toothed wheel (12) as in a free wheel, alternately drive the wheel (12). The wheels (11) and (13) are mounted on ball bearings with respect to the spindle (8). The wheel (12) is secured to the spindle (8) and the wheel (15) in order to transmit the movement to the driven wheel (2) by the pawl (14) and the engagement wheel (16). The wheel (5) in the case is secured to the driving wheel (1) outside the case and is provided with a variable-length arm with a small rod (6), which modifies the travel of the large rods (9) and (10) and causes a gear change. The small rod (6) is connected by ball bearings on its two spindles. The variable length depends on the magnitude of the force or torque on the driving wheel (1). The greater the force the more the spring with damper (19) extends, which bends the small rod (6) and moves the spindle (7) closer to the spindle (3) of the driving wheel (1). When the small rod (6) bends and the spindle (7) moves closer to the spindle (3), the travels of the rods (9) and (10) decrease and the rotation angles of the wheels (11) and (13) also decrease, which is equivalent to a gear change. The return spring (19) of the small rod (6) is provided with a damper in order to have even functioning. Its spring is enclosed in a tube with two holes and with a piston provided with a hole. The three holes are calibrated leakages. The presence of several holes is necessary so that the damper fills with oil when the case is filled with oil. The passage of oil in the holes slows down without blocking the movements of variation in length of the spring. The wheels (1) and (2) each drive a chain at the front chain wheel on the one hand and at the rear gear wheel of the bicycle on the other hand and are outside the case. The ball bearings (3) and (4) make it possible to pass through the case. They are moreover fluidtight in order to prevent any leaking of oil to the outside.

DETAILED DESCRIPTION

Figure 1:
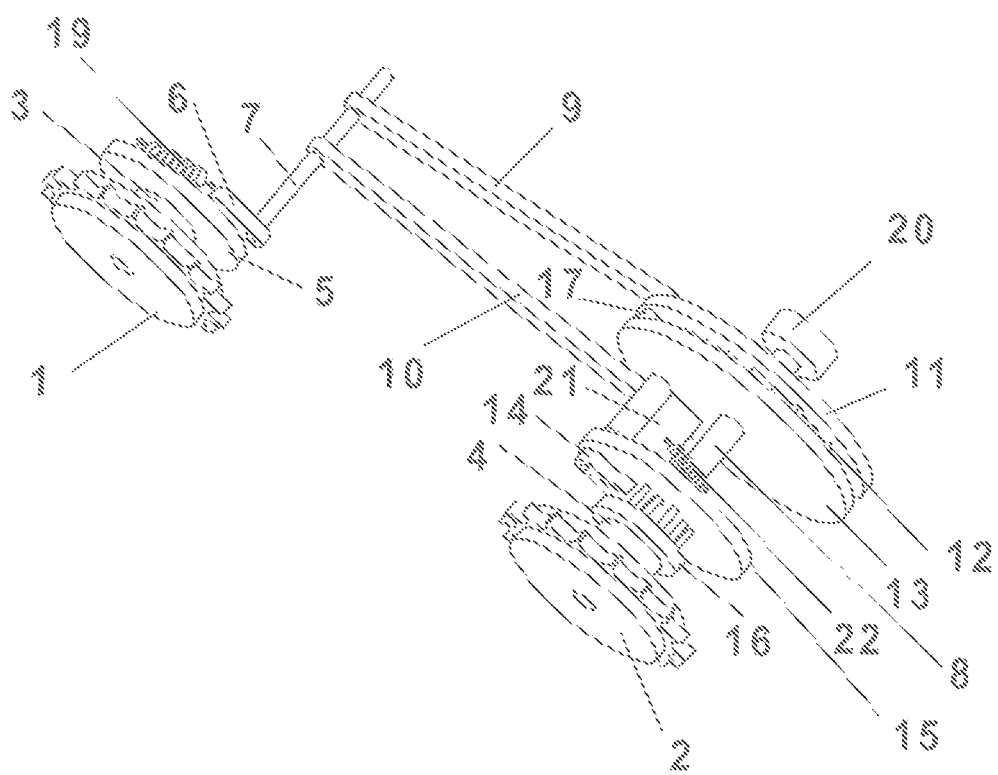
FIG. 1 is a perspective view of a forward and reverse pedaling system for a bicycle.
Figure 2:
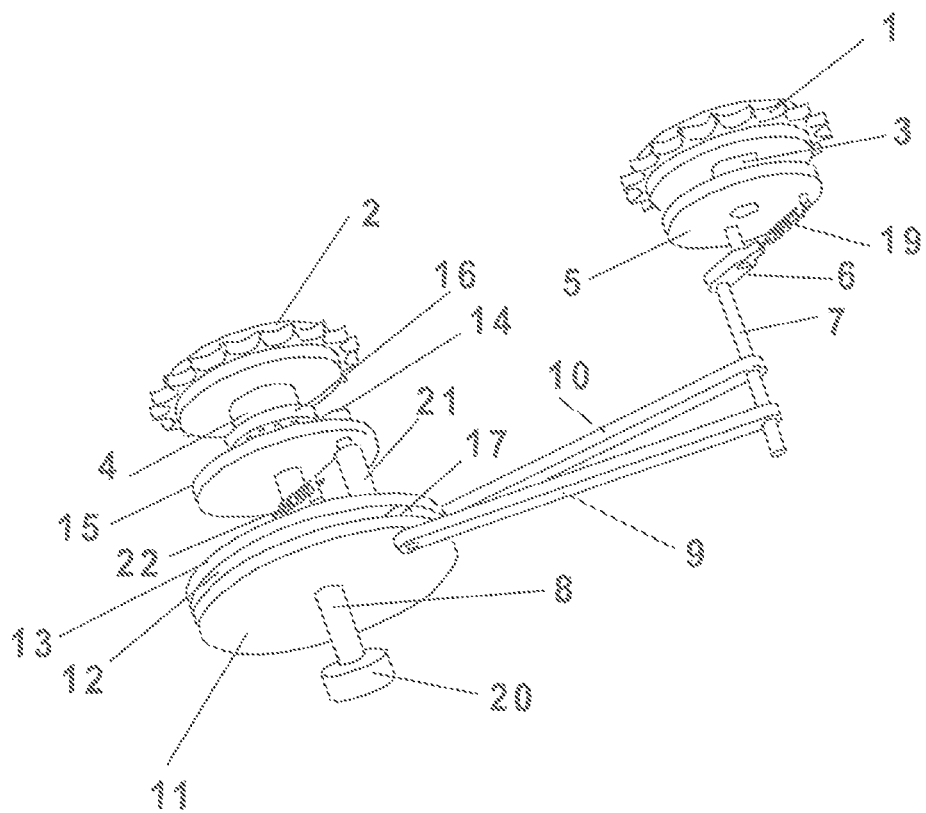
FIG. 2 is another perspective view of the forward and reverse pedaling system illustrated in FIG. 1.
Figure 3:
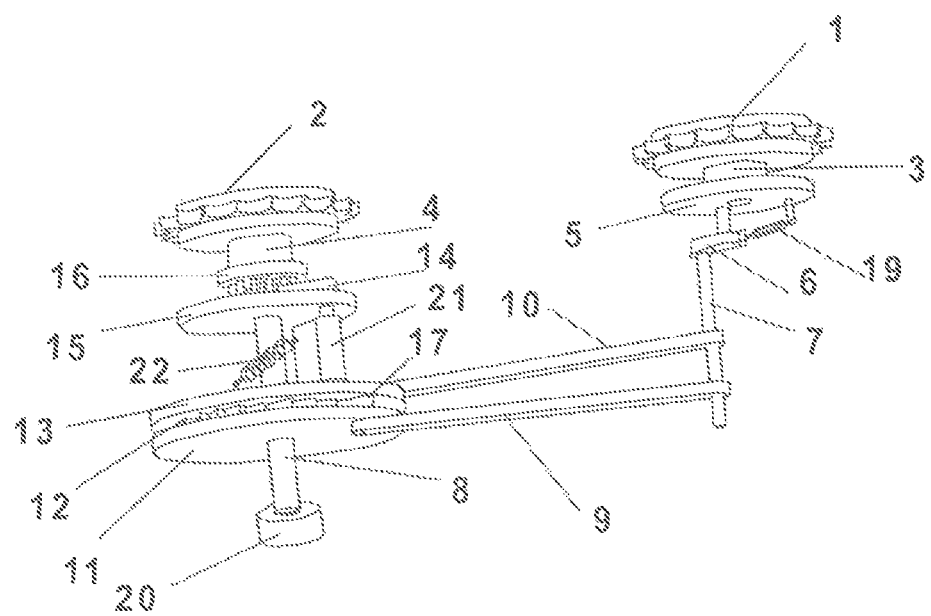
FIG. 3 is another perspective view of the forward and reverse pedaling system illustrated in FIG. 1.
Figure 4:
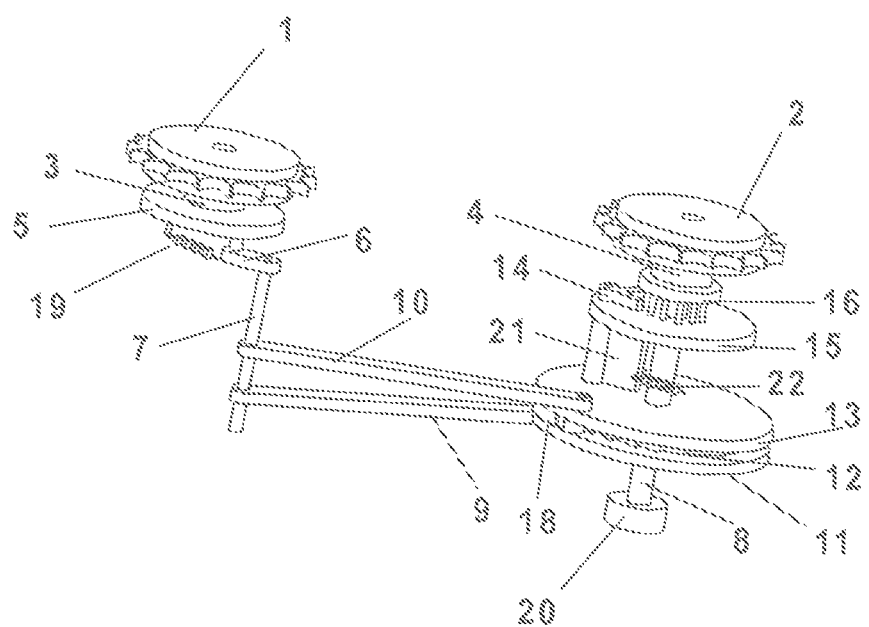
FIG. 4 is another perspective view of the forward and reverse pedaling system illustrated in FIG. 1.
Figure 5:
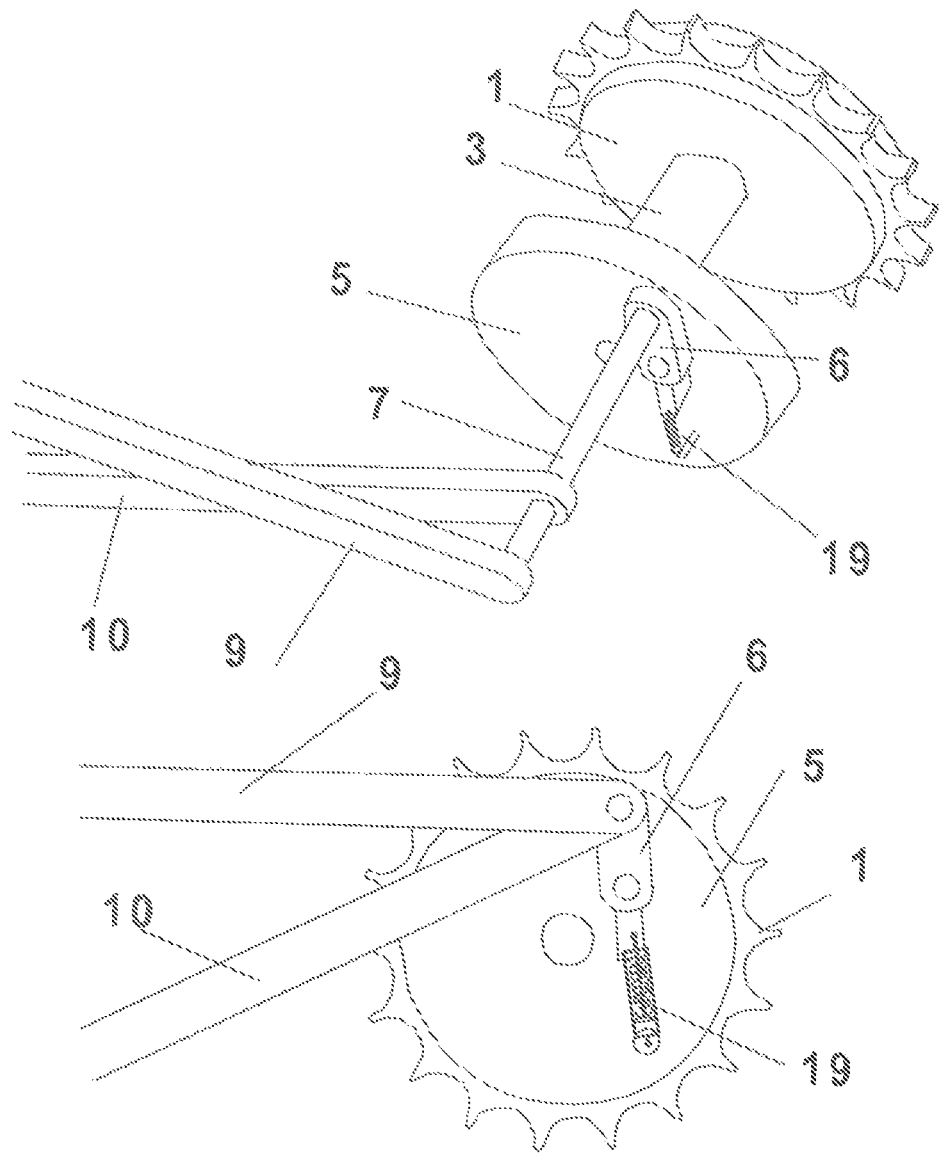
FIG. 5 is a partial view of the forward and reverse pedaling system illustrated in FIG. 1.
Figure 6:
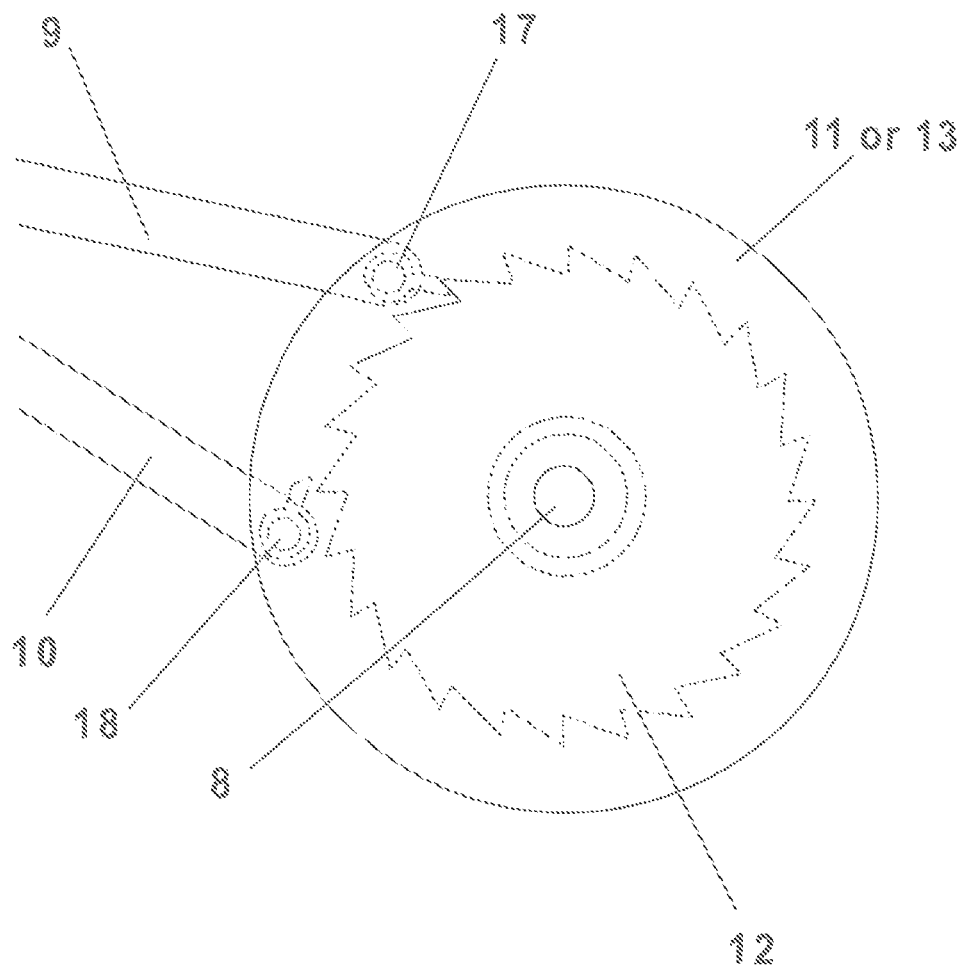
FIG. 6 is a partial view of the forward and reverse pedaling system illustrated in FIG. 1.
Figure 7:
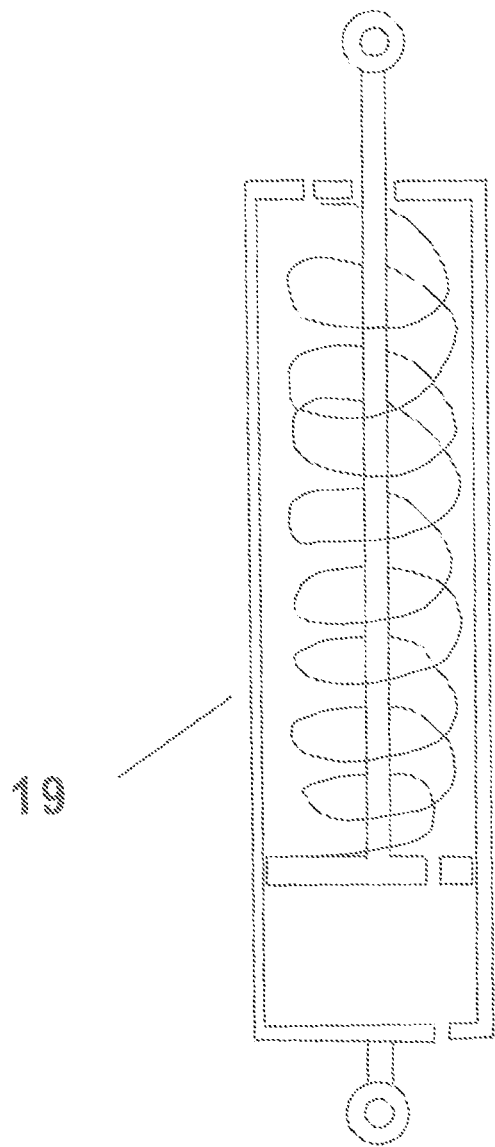
FIG. 7 is a cut away view of a spring with damper.
Figure 8:
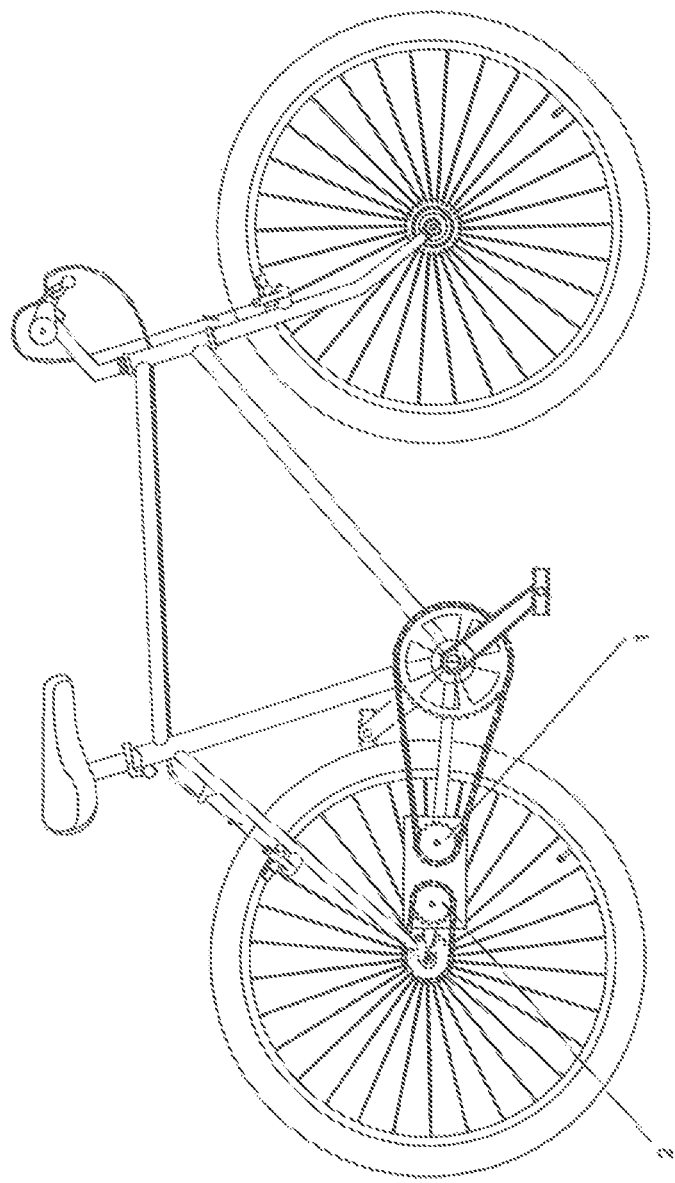
FIG. 8 is a side view of a bicycle incorporating the forward and reverse pedaling system illustrated in FIG. 1.

There is no discontinuity in the force transmitted to the wheel (12) and therefore to the drive wheel (2), A decoupling of the driven wheel (2) from the driving wheel (1) is achieved here if it is attempted to turn the driven wheel (2). This decoupling is achieved by the association of the wheel (15) secured to the wheel (12) and the spindle (8) with the engagement wheel (16) secured to the driven wheel (2).

The spindle (8) is mounted on a ball bearing (20) with respect to the case and is connected to the wheel (16) by another ball bearing.

The rotation of the wheel (15) tilts its pawl (14) because of the fluid hydrodynamic friction undergone by the keeper (21) of the pawl (14) since the entire mechanism is enclosed in the case filled with oil. The pawl (14) and the keeper (21) are secured by their spindle, which can turn through the wheel (15). The tilting of the pawl (14) makes it hook onto one of the studs on the wheel (16) secured to the driven wheel (2). The wheel (16) and the wheel (2) secured together are connected to the spindle (8) by a ball bearing on the one hand and to the case by the ball bearing (4) on the other hand. The oil provides excellent lubrication and good mechanical efficiency and is necessary to make the coupling of wheels (15) and (16) function. The pawl (14) provided with a keeper (21) moving in the oil creates a dynamic fluid friction proportional to the speed and therefore zero if the wheel (15) is not turning. A small return spring (22) recenters the pawl (14) if the wheel (15) stops turning, which is the case when the cyclist stops pedaling and the driving wheel (1) is no longer turning. The pawl (14) no longer hooks onto one of the studs on the wheel (16) when it is recentered. In this case the return spring automatically decouples the driven wheel (2), which can then turn freely. The wheel (2) turns with the fluidtight ball bearing (4) passing through the case.

In the mounting of this system on a bicycle, the driving wheel (1) is connected to the front chain wheel by a first chain. The driven wheel (2) is connected to the gear wheel on the rear wheel of the bicycle by a second chain.

The wheels (1) and (2) are outside the case.

The traction forces on the driving wheel (1) and the driven wheel (2) are opposed so that the system can be fixed to the bicycle fairly easily.

The device for coupling and decoupling the wheels (15) and (16) makes it possible not to lock the rear wheel of the bicycle if the cyclist is walking and pushing his bicycle backwards.

If it is wished to have a bicycle with an automatic gear change without reverse pedaling, it suffices to provide the driving wheel (1) with a free wheel so that the force of the cyclist is transmitted only if he is pedaling forwards.

The tension of the spring with damper (19) can be adjusted with a screw from outside the case in order to adjust the behavior of the automatic gear change to the force of the cyclist. This screw is screwed onto the wheel (5) while fixing the wheel (5) in a good angular position. For this purpose the cyclist opens a plug at the top of the case in order to reveal the access to the screw, turns the pedals gently so that the screw is facing the blade of the screwdriver, and tightens this screw to a greater or lesser extent in order to adjust the force of the automatic gear change.

This plug also makes it possible to fill the case with oil. A second plug at the bottom of the case is provided for draining the case of its oil during drainage.

The entire system: "automatic gear change, energy transmitted to the driven wheel (2) always in the same direction whatever the direction of pedaling of the driving wheel (1) and automatic clutch at very low speed between the wheels (15) and (16)" can be used in any mechanical assembly requiring it.

The system is not limited to a bicycle.

The invention claimed is:

1. A pedaling system for forward and reverse pedaling of a vehicle that includes an automatic gear change operating at a very low speed, the pedaling system comprising:
    a driving wheel;
    large rods connected to the driving wheel and configured to reciprocate back and forth less than a half of a turn regardless of a direction of rotation of the driving wheel;
    a first spindle;
    a driven wheel arranged on the first spindle;
    two wheels, including a first wheel and a second wheel, connected to and driven by the large rods and mounted on a first set of ball bearings that are secured to the first spindle, the first wheel having a first pawl and the second wheel having a second pawl;
    a toothed free wheel secured to the first spindle between the first wheel and the second wheel with the first pawl and the second pawl configured to engage with the toothed free wheel;
    an engagement wheel having teeth secured to the first spindle;
    a third wheel secured to the first spindle and including a third pawl configured to engage with the engagement wheel and transmit movement to the driven wheel by an interaction of the pawl and with the teeth of the engagement wheel; and
    a housing filled with oil substantially enclosing the pedaling system.

2. The pedaling system according to claim 1, further comprising a fourth wheel that is secured to the driving wheel, a variable-length arm with a small rod that is attached to the fourth wheel and adaptable to modify travel of the large rods and cause the gear change, a spring assembly, a second set of ball bearings, a second spindle, a third spindle and a fourth spindle, the small rod being connected by the second set of ball bearings at one end to the second spindle and at another end to the third spindle, the driving wheel being connected to the fourth wheel by the third spindle on which a first ball bearing is arranged, spacing the driving wheel from the fourth wheel,
    wherein the spring assembly is comprised a tube with two holes, a piston that has a hole and a first spring that includes a damper, arranged within the tube for even functioning and is connected at one end to the small rod and at another end to the fourth wheel,
    wherein the spring is a return spring and a length of the variable-length arm depends upon a magnitude of force on the driving wheel such that a greater the force, the more the spring with the damper extends, which in turn rotates the small rod and moves the third spindle closer to the fourth spindle and in turn travel of the large rods decrease and rotation angles of the gear change,
    wherein the holes of the tube and the hole of the piston are calibrated such that when the tube and the housing fill with the oil the holes slow the flow of the oil without blocking the movements of variation in length of the spring, and
    wherein the driving wheel and the driven wheel are arranged outside of the housing with the first ball bearing and the second ball bearing sealing openings formed in the housing through which the driven wheel and the driving wheel extend, such that the openings formed in the housing are fluidtight in order to prevent any leaking of the oil from the housing.

3. The pedaling system according to claim 1, wherein a continuous force transmitted to the toothed wheel and to the driven wheel.

4. The pedaling system according to claim 1, further comprising a keeper fixed to the third pawl through an opening in the third wheel by a fifth spindle, and wherein the driven wheel is decoupled from the driving wheel when an attempt is made to turn the driven wheel, the rotation of the third wheel tilting the third pawl as a result of fluid hydrodynamic friction undergone by the keeper due to the system being enclosed in the housing filled with oil, the tilting of the third pawl in turn hooks the third pawl onto one of the teeth of the engagement wheel, a movement of the third pawl within the oil creating a dynamic fluid friction that is proportional to a speed of rotation, and a second spring, which is a return spring, recenters the third pawl when the third wheel is stationary such that the third pawl no longer hooks onto the one of the teeth of the engagement wheel when the third pawl is recentered and the return spring automatically decouples the driven wheel, which is configured to then be freely turnable.

5. The pedaling system according to claim 1, wherein the driving wheel is connected to a front chain wheel by a first chain, the driven wheel is connected to a gear wheel on a rear wheel of a bicycle by a second chain with the driving wheel and the driven wheel arranged outside of the housing and traction forces on the driving wheel and the driven wheel are opposed so that the system is fixable to the bicycle.

6. The pedaling system according to claim 1, wherein, when the pedaling system is mounted onto a bicycle, and the system is configured to prevent the rear wheel of the bicycle from locking when a cyclist is walking and pushing the bicycle backwards.

7. The pedaling system according to claim 1, wherein the vehicle is a bicycle with the automatic gear change mounted thereon and the driving wheel includes a free wheel so that a pedaling force of a cyclist is transmitted only if the cyclist is pedaling in a forward direction.

8. The pedaling system according to claim 1, further comprising a spring with a screw and damper arranged within the housing that has a first opening allowing the housing to be filled with the oil and that is sealable by a first plug and a second opening configured to drain the oil from the housing and that is sealable by a second plug, the damper being is adjustable by accessing the screw through the first opening and tightening or loosening the screw from outside of the housing in order to adjust the automatic gear change to a force applied to the system, the screw is screwed onto the wheel while fixing the wheel in an angular position.

9. The pedaling system according to claim 1, wherein the vehicle comprises any mechanical assembly.

* * * * *